US011002334B2

(12) United States Patent
Cox

(10) Patent No.: US 11,002,334 B2
(45) Date of Patent: May 11, 2021

(54) DIGRESSIVE VALVE FOR A DAMPER

(71) Applicant: MF IP Holding, LLC, West Jordan, UT (US)

(72) Inventor: Christopher Paul Cox, West Jordan, UT (US)

(73) Assignee: MF IP Holding, LLC, West Jordan, UT (US)

( * ) Notice: Subject to any disclaimer, the term of this patent is extended or adjusted under 35 U.S.C. 154(b) by 0 days.

(21) Appl. No.: 16/415,947

(22) Filed: May 17, 2019

(65) Prior Publication Data

US 2019/0271373 A1 Sep. 5, 2019

Related U.S. Application Data

(63) Continuation-in-part of application No. 15/338,131, filed on Oct. 28, 2016, now Pat. No. 10,344,820.

(51) Int. Cl.
*F16F 9/348* (2006.01)
*F16F 9/32* (2006.01)

(52) U.S. Cl.
CPC .......... *F16F 9/3488* (2013.01); *F16F 9/3214* (2013.01); *F16F 9/348* (2013.01); *F16F 2228/12* (2013.01)

(58) Field of Classification Search
CPC ............... B60G 13/08; B60G 2202/24; B60G 2206/41; B60G 17/08; F16F 9/348; F16F 9/3485; F16F 9/3488; F16F 9/18; F16F 9/185; F16F 9/465; F16F 9/3214; F16F 9/3482; F16F 9/3487; F16F 9/3484; F16F 9/5126; F16F 9/32

USPC .. 188/322.15, 322.22, 313, 282.9, 283, 317, 188/322.14, 322.13, 282.6, 266.6, 316
See application file for complete search history.

(56) References Cited

U.S. PATENT DOCUMENTS

| | | | |
|---|---|---|---|
| 4,197,929 | A | 4/1980 | Imai |
| 4,972,929 | A | 11/1990 | Ivers et al. |
| 5,529,398 | A | 6/1996 | Bosley |
| 5,921,360 | A | 7/1999 | Moradmand |
| 6,260,678 | B1 | 7/2001 | Moradmand et al. |
| 6,581,734 | B2 | 6/2003 | Heyn et al. |
| 6,655,512 | B2 | 12/2003 | Moradmand et al. |

(Continued)

FOREIGN PATENT DOCUMENTS

WO 2015/158495 A1 10/2015

*Primary Examiner* — Robert A. Siconolfi
*Assistant Examiner* — San M Aung
(74) *Attorney, Agent, or Firm* — Christensen O'Connor Johnson Kindness PLLC

(57) ABSTRACT

Generally described, dampers having shimmed pistons are configured for use with vehicle suspensions. The dampers generally include a shaft having a piston with compression and rebound valves extending therethrough. The piston interfaces a shim assembly at the valve outlets such that damping fluid flow is controlled through a set of valves in one direction, and the damping fluid flow is limited through the same set of valves in the opposite direction. In this regard, the shim assembly is configured to provide bleed relief of the hydraulic damping fluid at lower shaft speeds and deflect away from the piston higher shaft speeds. The shim assembly generally includes a ring shim that interfaces a shim stack to provide a configurable preload for the deflectable shims and a flow path for the hydraulic damping fluid during bleed relief.

18 Claims, 15 Drawing Sheets

(56) References Cited

U.S. PATENT DOCUMENTS

| | | |
|---|---|---|
| 7,238,112 B2 | 7/2007 | Bastel et al. |
| 7,980,368 B2 | 7/2011 | Park |
| 8,517,154 B2 | 8/2013 | Maeda |
| 2002/0063023 A1 | 5/2002 | Moradmand et al. |
| 2004/0166764 A1 | 8/2004 | Stark |
| 2005/0056505 A1* | 3/2005 | Deferme ............... F16F 9/3485 188/322.15 |
| 2006/0283676 A1* | 12/2006 | Deferme ............... F16F 9/3214 188/322.13 |
| 2009/0057080 A1* | 3/2009 | Deferme ............... F16F 9/3488 188/313 |
| 2013/0319804 A1* | 12/2013 | Six ........................ F16F 9/26 188/313 |
| 2014/0262655 A1* | 9/2014 | Tuts ...................... F16F 9/348 188/322.15 |
| 2015/0041264 A1* | 2/2015 | Goldasz ............... F16F 9/3484 188/313 |
| 2015/0159724 A1 | 6/2015 | Kiyonaga |
| 2015/0316118 A1 | 11/2015 | Smeljanskij et al. |
| 2016/0017914 A1 | 1/2016 | Visseus et al. |
| 2016/0356335 A1* | 12/2016 | Nomura ............... F16F 9/3485 |

\* cited by examiner

DIGRESSIVE VALVE FOR A DAMPER

CROSS-REFERENCE TO RELATED APPLICATION

This application is a continuation-in-part of U.S. application Ser. No. 15/338,131, filed Oct. 28, 2016, the disclosure of which is hereby expressly incorporated by reference herein in its entirety.

BACKGROUND

A damper provides a damping force in reaction to motion. A damper is typically filled with a damping fluid to provide fluidic resistance to the motion of a piston traveling through the damping fluid. A conventional piston generally includes valves for compression flow of damping fluid and valves for rebound flow of damping fluid. In this regard, shims are used to block one set of valves during each motion of the piston. For example, if the damper is experiencing a compression stroke, the rebound valves are blocked by the rebound shims. Conversely, when the damper is in a rebound stroke, the compression valves are blocked by the compression shims.

Shim configuration can greatly impact the performance and damping characteristics of the damper. Generally, a combination of different thicknesses and sizes of shims (referred to as a "shim stack") is used to tailor the characteristics of the damper during use. Shims are typically metallic discs that are capable of bending with a low rate of fatigue. In this regard, spring steel is often a material used for the shims. When the damper is in a compression stroke, and the rebound valves are blocked by the rebound shims, the compression shim stack is necessarily bent away from the compression valves to allow flow of the damping fluid through the piston. The rate of the flow determines the damping force. If the compression shim stack allows freely flowing damping fluid through the compression valves, the damping effect will be small. If the compression shim stack greatly restricts flow of damping fluid through the compression valves, the damping effect will be high.

Given the influence of the shim stack on the performance and damping characteristics of the damper, the shims are often configured in a manner that provides consistent and repeatable damper performance. The damper can be tuned by adjusting the shim stacks. In one configuration, a shim stack can be preloaded such that the shims do not bend to allow flow through the piston valves until a certain damper speed is reached. In this regard, the low speed travel of the damper has a higher damping force before the shim stack bends to allow flow through the piston valves. A variety of configurations for preloading the shim stack exist in conventional dampers. In one example, a digressive piston is used to apply a preload to the shim stack. Digressive pistons can be expensive and require very specific installations to perform as desired. Another configuration to preload the shim stack is to use a ring shim. In this type of preload configuration, the ring shim is positioned within the shim stack to bend, or preload, the shim stack. Often the ring shim can become misaligned, giving inconsistent performance characteristics for the damper.

SUMMARY

In accordance with one embodiment of the present disclosure, a damper having a shimmed piston is provided. The damper generally includes an elongate shaft having a first end and a fastener configured to retain the piston on the first end, the piston having a proximal end, a distal end, and a first valve extending therethrough; and a first shim assembly disposed around the elongate shaft at the first end and adjacent to the distal end of the piston. The first shim assembly generally includes a first shim having a first bleed port in fluid communication with the first valve and a central aperture configured to receive the elongate shaft, the first shim configured to overlap the first valve at the distal end of the piston; a first ring shim assembled to the first end of the elongate shaft and configured to abut the first shim; and a second shim installed at the first end of the elongate shaft, the second shim interfacing a radially inward projection of the first ring shim and having a first bleed relief such that when the second shim abuts the radially inward projection of the first ring shim, the first bleed relief provides a fluid path across the second shim along a surface of the first ring shim.

In accordance with another embodiment of the present disclosure, a shimmed piston for a damper is provided. The shimmed piston generally includes a first valve extending through the shimmed piston; and a first shim assembly disposed adjacent to a distal end of the shimmed piston. The first shim assembly generally includes a first shim having a first bleed port in fluid communication with the first valve and a central aperture configured to receive an elongate shaft, the first shim configured to overlap the first valve at the distal end of the shimmed piston; a first ring shim configured to abut the first shim; and a second shim interfacing a radially inward projection of the first ring shim and having a first bleed relief such that when the second shim abuts the radially inward projection of the first ring shim, the first bleed relief provides a fluid path across the second shim along a surface of the first ring shim.

In accordance with any of the embodiments described herein, the first shim may further comprise a clocking protrusion positioned relative to the first bleed port, the clocking protrusion configured to position the first bleed port relative to the first valve.

In accordance with any of the embodiments described herein, the second shim may be deflectable to provide a preload to the first shim assembly in reaction to clamping the piston with the fastener.

In accordance with any of the embodiments described herein, a perimeter of the central aperture of the first shim may be fixed in a direction along the elongate shaft by the clamping of the piston with the fastener.

In accordance with any of the embodiments described herein, the first shim assembly may further comprise a third shim positioned at a distance from the second shim, wherein the third shim may be configured to deflect away from the piston as a result of a contact force by the second shim during deflection of the second shim as a result of damping fluid flow through the first valve.

In accordance with any of the embodiments described herein, the third shim may be positioned at a distance from the second shim by a washer positioned therebetween, and wherein the diameter of the washer may be smaller than the diameter of the third shim.

In accordance with any of the embodiments described herein, the piston may further comprise a second valve, and wherein the first shim may be configured to deflect away from the first ring shim at portions of the first shim adjacent to the second valve.

In accordance with any of the embodiments described herein, the first shim may be configured to deflect away from the piston as a result of damping fluid flow through the first valve.

In accordance with any of the embodiments described herein, the first ring shim may have a wall projecting axially from a surface of the radially inward projection configured to stiffen the first ring shim upon installation.

In accordance with any of the embodiments described herein, the damper may further include a second valve extending through the piston; and a second shim assembly disposed around the elongate shaft at the first end and adjacent to the proximal end of the piston. The second shim generally includes a fourth shim having a second bleed port in fluid communication with the second valve and a central aperture configured to receive the elongate shaft, the fourth shim configured to overlap the second valve at the proximal end of the piston; and a second ring shim assembled to the first end of the elongate shaft such that the fourth shim is positioned between the piston and the second ring shim, wherein the second bleed port may provide a fluid path across the fourth shim along a surface of the piston.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
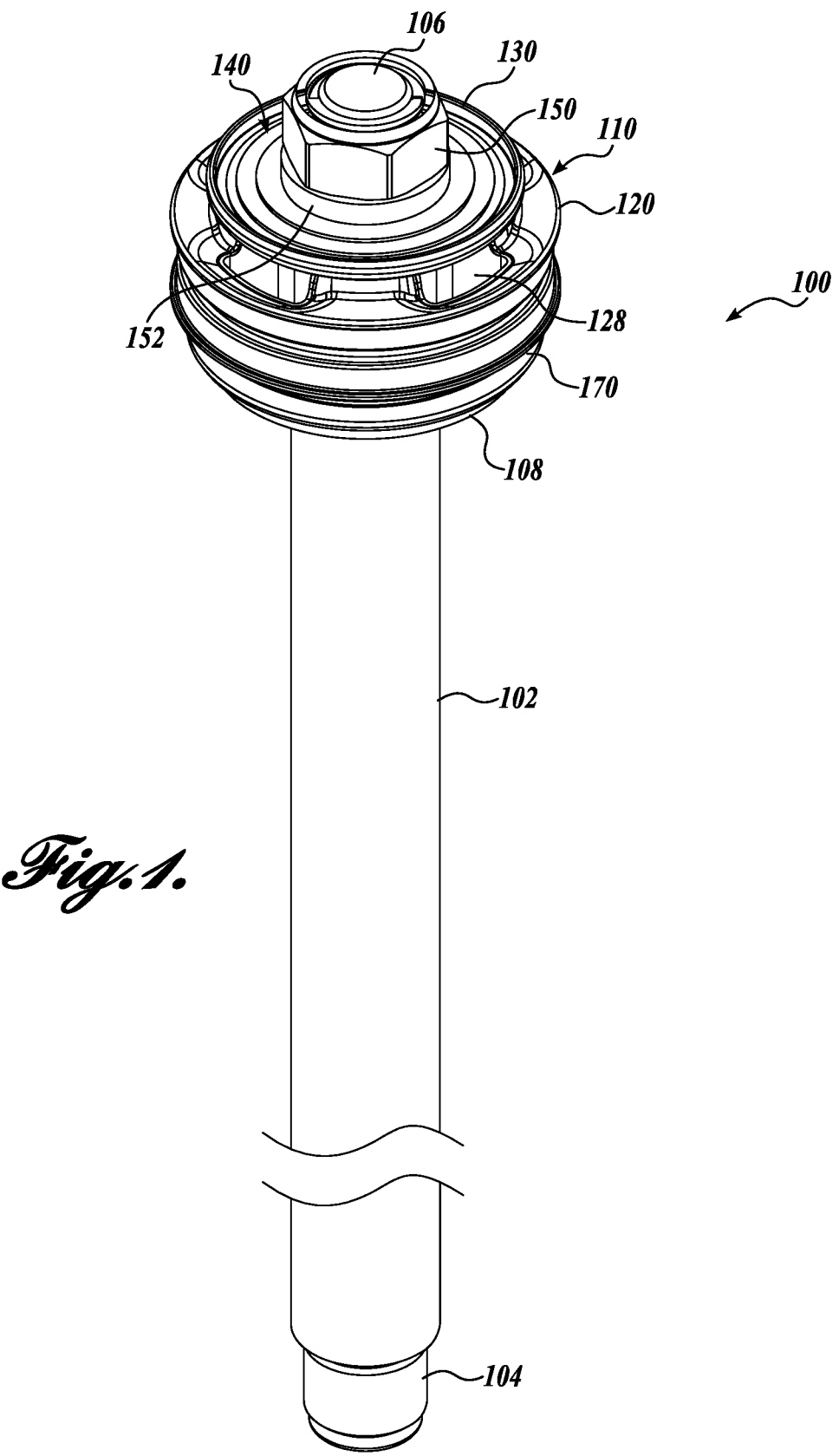
FIG. 1 is a front top perspective view of one representative embodiment of a damper valve assembly in accordance with an aspect of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The following description provides several examples that relate to dampers having shimmed pistons to provide a damping effect. Embodiments of the present disclosure are generally directed to adjusting the damping characteristics of a damper using shim configurations in conjunction with a piston. Embodiments of the dampers disclosed herein are suitable to attach to any components between which a damping force is desired (e.g., a vehicle suspension system). Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A damper having a shimmed piston generally includes an elongate shaft with a piston fixed at one end. As the shaft travels in an axial direction, the piston travels through hydraulic damping fluid in a central bore of the damper body. The piston generally includes apertures (referred to as "valves") extending through the piston and sized such that the valves provide fluidic resistance as the piston travels through the hydraulic damping fluid. In this regard, the movement of the piston through the hydraulic damping fluid provides a force counter to the movement of the shaft, resulting in a damping effect of the motion of the shaft. The force provided by the hydraulic damping fluid is dependent on a range of factors, including hydraulic damping fluid viscosity, temperature, pressure, purity, composition; shaft velocity; and piston aperture size and shape, among other factors.

In a damper with a piston designed for use with a shim assembly (often referred to as a "shim stack"), the valves in the piston are configured such that only certain of the valves are intended for hydraulic damping fluid flow during a compression stroke of the damper (insertion of the shaft within the damper body), and certain other of the valves are intended for hydraulic damping fluid flow during a rebound stroke of a damper (extension of the shaft from the damper body). As a result, the valves can be tailored or "tuned" to exhibit the desired damping characteristics depending on the intended use of the damper. If shims were not used with the piston, an excess of hydraulic damping fluid would simultaneously flow through all of the valves, and would provide a low damping effect.

To limit the flow to only the designated valves, upon assembly of the damper, a shim stack is used to overlap the valve openings such that the flow of hydraulic damping fluid is only allowed in one direction in the valves intended for the compression stroke (compression valves), and in the opposite direction in the valves intended for the rebound stroke (rebound valves). In this regard, the hydraulic damping fluid flows through the valve and exerts a force on the shim stack such that the shim stack deflects away from the valve and allows the flow of hydraulic damping fluid. Since an opposing shim stack is overlapping the other set of valves, flow is contained within only the intended valves when the shaft of the damper is moving in either direction.

In some embodiments, one or more sealing and preload shims with bleed relief are used in the shim stack. Such sealing and preload shims may include various bleed relief configurations intended to allow a metered amount of hydraulic damping fluid to flow past the shims without deflecting the shims. Embodiments of the sealing and preload shims, configured with bleed ports, radial bleed reliefs, or other suitable bleed relief, form a portion of the shim stack to provide increased tuning of the performance and damping characteristics of the damper, particularly during slower shaft movements during slow speed damping. Although the sealing and preload shims having bleed relief are described herein as used in the shim stack on the compression side of the piston valve, such sealing and preload shims having bleed relief are suitable for use in the shim stack on the rebound side of the piston valve.

A shim stack used in conventional dampers has a wide variety of configurations. In general, the shims are arranged such that they provide a certain resistance to the flow of the hydraulic damping fluid through the valves. The valves have a shape and size to correspond to desired flow characteristics of the piston. In the illustrated embodiments, the compression and rebound valves are shown with one representative embodiment; however, in other embodiments, any suitable piston valve configuration is used in conjunction with the ring shim of the present disclosure. As a result of separate shim stacks assembled to the valves of the piston, the characteristics of the damper can be controlled independently in compression and rebound operation. Often, adjustment to the compression and rebound is achieved independently and allows tailoring of the damper to the specific application. For example, in an automotive damper working in conjunction with a spring, a high damping effect on the compression stroke can lead to a harsher ride, but can assist in maintaining stability for high-speed operation. The rebound stroke having a high damping effect can lead to a ratcheting effect of the suspension where the damper does not allow quick enough movement to return to an optimal setting after encountering a series of compressions. Therefore, a damper must be tailored to a specific application while taking into account, weight, terrain, spring forces, performance expectations, ride quality, etc.

A damper typically has different damping effect depending on the speed of the shaft. In this regard, slow speed damping can be controlled using different valves than the valves intended for high speed damping. Using the automotive damper as an example, the slow speed damping may include rolling over the crest of a hill, or the compression of the suspension as the vehicle dives while braking or rotates into a corner. In contrast, the high speed damping may include hitting a bump at speed or driving on an uneven road surface. Often a damper will be designed to exhibit different damping characteristics for slow and high speed damping. In this regard, preload of the shim stack and/or shims having bleed relief can be used to tailor of damping characteristics. Preloading the shim stack involves the shims being slightly deflected in a neutral state by the configuration of the assembly of the shaft and piston. Among other advantages, such as consistency of damping characteristics, a preload of the shim stack can limit the opening of the shims (deflection) to only certain higher speeds of the shaft of the damper. The preload and/or bleed relief may prevent the shims from deflecting during the aforementioned slow speed damping, while allowing high speed damping.

Continuing with the automotive example, the performance of a vehicle may improve by providing a higher damping force during slow speed damping, and a lower damping force during high speed damping. In this example, the cornering (slower speed damping) of the vehicle may improve by keeping the chassis in a relatively neutral position, while encountering a sharp bump in that corner (high speed damping) allows the damper to deflect quickly with the bump and improve the contact of the tire with the road surface, increasing grip. Many other examples exist, such as having a higher damping effect during pedaling of a bicycle (slow speed damping) as opposed to a lower damping effect during bumps (high speed damping) for a smoother ride, especially while on an unimproved road. Although these examples are used to illustrate the potential uses for tailoring of a damper using shim stacks, it should be appreciated that the embodiments of the present disclosure are intended for any suitable shim configuration and damping installation.

Referring initially to FIGS. 1-5, a first exemplary embodiment of a shimmed piston assembly 100 suitable for use with a damper (not shown) is depicted. The shimmed piston assembly 100 is shown coupled to one end of a shaft 102 having a distal end 104 and a proximal end 106. The distal end 104 of the shaft 102 is typically configured to couple with a mounting joint (not shown) to attach to a component for which a damping effect is desired. In the embodiments of the present disclosure, the proximal end 106 of the shaft 102 is configured to carry the shimmed piston assembly 100 with a necked section 112 of the shaft 102. The shimmed piston assembly 100 is secured to the necked section 112 with a fastener assembly, such as a nut 150, interfacing a threaded section 114 of the shaft 102 (see FIG. 4), and an upper washer 152 disposed between the nut 150 and the shimmed piston assembly 100. In the illustrated embodiment, the nut 150 is preferably a locking nut such that movement of the shaft 102 does not allow the nut 150 to loosen over time. In other embodiments, the nut 150 is coupled to the threaded section 114 using a locking fluid (not shown). In further embodiments, the nut 150 is installed with a sufficient torque such that the nut 150 does not loosen during use of the damper.

The shimmed piston assembly 100 is secured distal to the nut 150 using a primary washer 108, which is configured to interface a shoulder at a transition between the necked section 112 and the shaft 102 to prevent sliding movement of the shimmed piston assembly 100 along the shaft 102. In other embodiments, the shimmed piston assembly 100 is coupled to any suitable location along the shaft 102 using any suitable coupling.

The shimmed piston assembly 100 will now be described in detail. As shown most clearly in FIG. 2, one embodiment of the shimmed piston assembly 100 includes a piston 120 having rebound valves 126 and compression valves 128 extending therethrough. The rebound valves 126 are configured to allow the flow of hydraulic damping fluid during the rebound stroke (extension) of the shaft 102. Conversely, the compression valves 128 are configured to allow the flow of hydraulic damping fluid during the compression stroke (insertion) of the shaft 102. Although one representative embodiment of the rebound and compression valves 126 and 128 is shown, any suitable valve configuration can be used with the embodiments of the present disclosure.

The rebound valves 126 of the piston 120 interface a rebound shim assembly 110 disposed between the piston 120 and the upper washer 152. The rebound shim assembly 110 is configured to overlap the rebound valves 126 such that flow of the hydraulic damping fluid is prevented during the compression stroke, and limited by the rebound shim assembly 110 during the rebound stroke. As described above, for flow of the hydraulic damping fluid through the rebound valves 126 during a rebound stroke, the rebound shim assembly 110 must necessarily deflect away from the piston 120 to incrementally open the passageway through the rebound valves 126. In the illustrated embodiment, the rebound shim assembly 110 completely overlaps the rebound valves 126. In other embodiments, the rebound shim assembly 110 overlaps a portion of the rebound valves 126.

In a similar manner, the compression valves 128 of the piston 120 interface a compression shim assembly 180 disposed between the piston 120 and the primary washer 108. The compression shim assembly 180 is configured to overlap the compression valves 128 such that flow of the hydraulic damping fluid is prevented during the rebound stroke, and limited by the compression shim assembly 180 during the compression stroke. As described above, for flow of the hydraulic damping fluid through the compression valves 128 during a compression stroke, the compression shim assembly 180 must necessarily deflect away from the piston 120 to incrementally open the passageway through the compression valves 128. In the illustrated embodiment, the compression shim assembly 180 completely overlaps the compression valves 128. In other embodiments, the compression shim assembly 180 overlaps a portion of the rebound valves 128. In further embodiments, as will be described in greater detail below, the compression shim assembly 180 includes one or more bleed reliefs. Each of the rebound and compression shim assemblies 110 and 180 includes various components configured to affect the damping characteristics. Although representative embodiments are illustrated and described herein, it should be appreciated that any shim configuration is suitable for use with the present disclosure, and the advantages are not limited to the configurations illustrated and described herein.

The components of the rebound and compression shim assemblies 110 and 180 will now be described in more detail. Initially referring to the rebound shim assembly 110, as shown most clearly in FIGS. 2 and 3, a rebound overlap shim 122 is configured to closely interface the piston 120 and overlap the rebound valves 126 as described above. The rebound overlap shim 122 provides the initial sealing component to prevent flow of the hydraulic damping fluid through the rebound valves 126 during the compression stroke of the shaft 102. The interface of the rebound overlap shim 122 with the rebound valves 126 of the piston 120 is shown in FIG. 4. As illustrated, the rebound overlap shim 122 overlaps the rebound valve 126 to prevent the flow of hydraulic damping fluid while the piston travels in the direction of the compression stroke (i.e., travel in a direction leading with the proximal end 106 of the shaft 102).

Adjacent to the rebound overlap shim 122 is assembled at least one rebound preload adjustment washer 124, which will be described in greater detail below. At an outer perimeter of the rebound overlap shim 122, a rebound preload ring shim 130 is adjacent to the rebound overlap shim 122. Next, a rebound shim stack assembly 140 is disposed adjacent a radially inward annular projection 166 (see FIG. 10) of the rebound preload ring shim 130. The rebound shim stack assembly 140 interfaces the radially inward annular projection 166 in an axial direction, and the necked section 112 of the shaft 102 in a radial direction at the inner aperture of each shim in the rebound shim stack assembly 140. The rebound shim stack assembly 140 is illustrated as having a first rebound shim 132, a second rebound shim 134, a third rebound shim 136, and a fourth rebound shim 138, each shim in order of descending outer radius away from the rebound preload ring shim 130. The first rebound shim 132 is radially sized to interface a circumferential projection 168 (see FIG. 10) of the rebound preload ring shim 130.

As can be seen most clearly in FIG. 4, the stacked configuration of the rebound shim assembly 110 includes a gap between the first rebound shim 132 and the rebound preload adjustment washer 124. To set a preload in the rebound shim assembly 110 the aforementioned gap is reduced by tightening the nut 150 during assembly, such that the first rebound shim 132 and the rebound preload adjustment washer 124 abut (see FIG. 5). The rebound shim stack assembly 140 is deflected as a result of drawing the first rebound shim 132 to the rebound preload adjustment washer 124 during tightening of the nut 150. In this configuration, the amount of preload on the rebound shim stack assembly 140 can be controlled by the width of the gap. During use of the shimmed piston assembly 100, all of the components of the rebound shim assembly 110 deflect away from the piston 120 to allow hydraulic damping fluid flow through the rebound valves 126.

Figure 10:
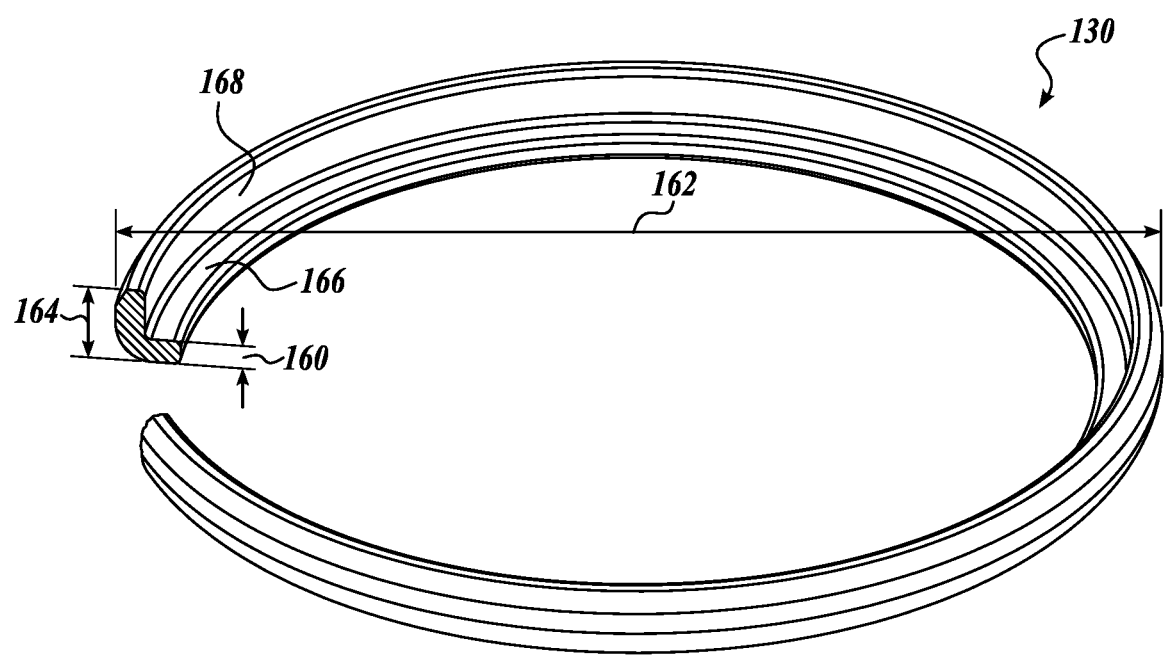
FIG. 10 is a front top perspective cutaway view of a ring shim of the damper valve assembly of FIG. 1.

The rebound preload adjustment will now be described in detail. As shown in FIG. 10, the rebound preload ring shim 130 includes the radially inward annular projection 166 having a ring shim axial thickness 160, and the circumferential projection 168 having a ring shim height 164. The rebound preload ring shim 130 also has a diameter 162. The diameter 162 is sized such that the first rebound shim 132 will fit within the aperture of the circumferential projection 168 and abut an upper surface of the radially inward annular projection 166. As can be appreciated by the configuration shown in FIG. 4, the gap between the first rebound shim 132 and the rebound preload adjustment washer 124 is controlled by the ring shim axial thickness 160 and the thickness of the rebound preload adjustment washer 124. In one example, if a preload gap distance of 0.020" is desired, the ring shim axial thickness 160 can be 0.040" and the rebound preload adjustment washer 124 can be 0.020" to arrive at the desired 0.020" preload gap distance. In other embodiments, any combination of ring shim axial thickness 160 and thickness of the rebound preload adjustment washer 124 is used to suitably control the preload gap distance. In further embodiments, the rebound preload adjustment washer 124 is omitted, or more than one rebound preload adjustment washer 124 is used with the configuration. In embodiments where the rebound preload adjustment washer 124 is omitted, the first rebound shim 132 directly abuts the rebound overlap shim 122 upon drawing the components together with the nut 150.

One advantage of assembling the rebound shim assembly 110 with the rebound preload adjustment washer 124 and the rebound preload ring shim 130 is to limit the need for rebound preload ring shims 130 with a wide variety of ring shim axial thicknesses 160. In this regard, fewer part variations can be manufactured and adapted to fit a wider range of preload settings. In another aspect, as a result of the radial interface of the first rebound shim 132 with the circumferential projection 168, the rebound preload ring shim 130 is substantially axially centered with respect to the shaft 102. The circumferential projection 168 additionally provides structural rigidity to the rebound preload ring shim 130 for further consistency in preload settings and damping characteristics of the assembly.

Figure 2:
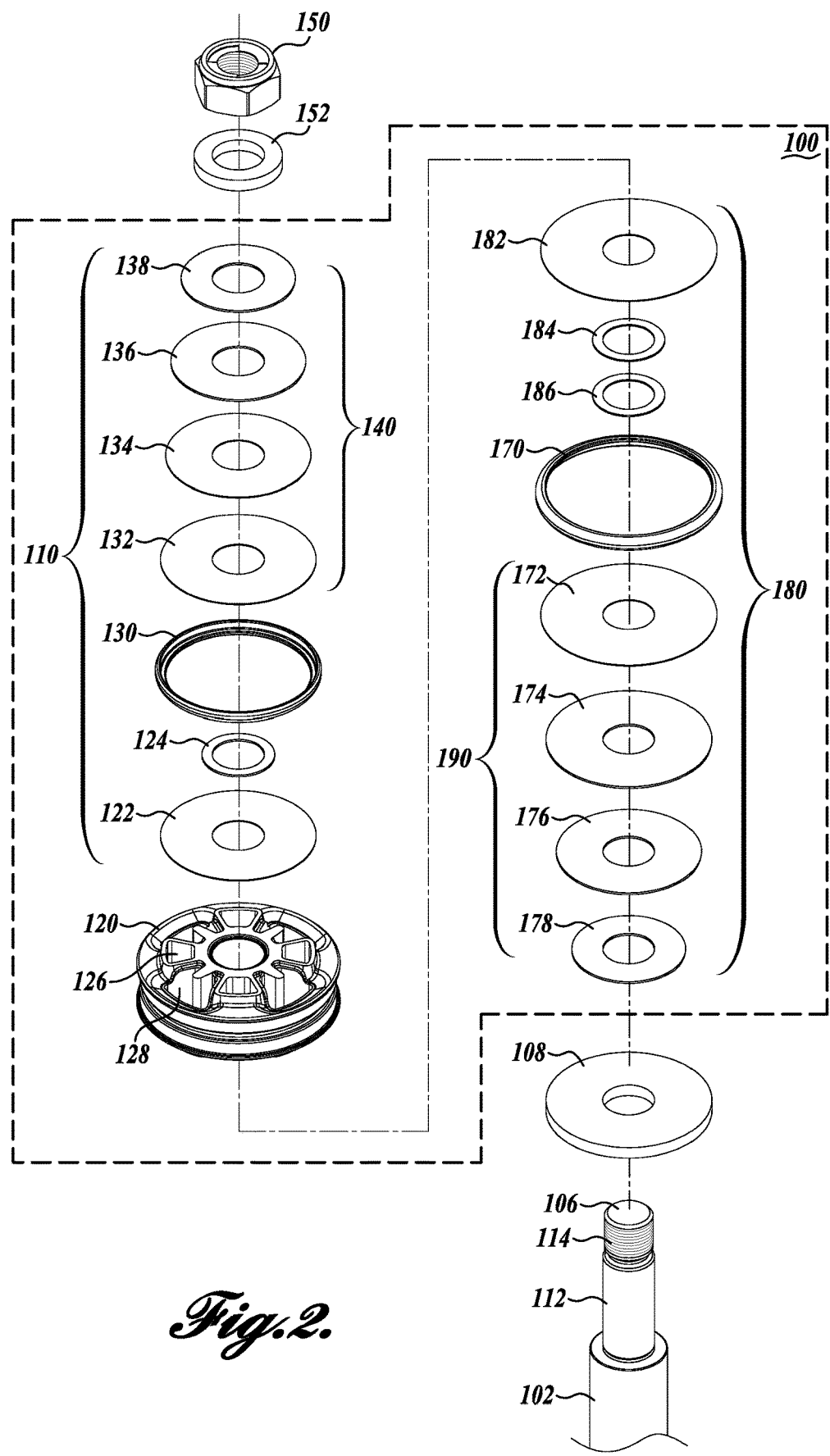
FIG. 2 is a front top exploded view of the damper valve assembly of FIG. 1.
Figure 3:
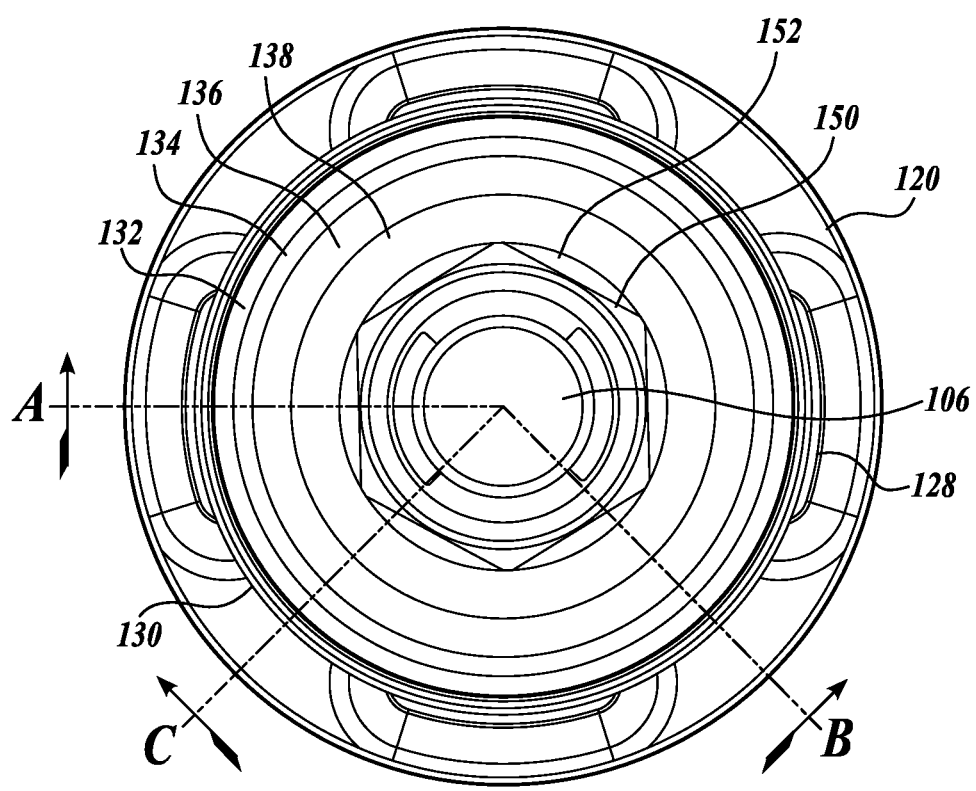
FIG. 3 is a top view of the damper valve assembly of FIG. 1.
Figure 4:
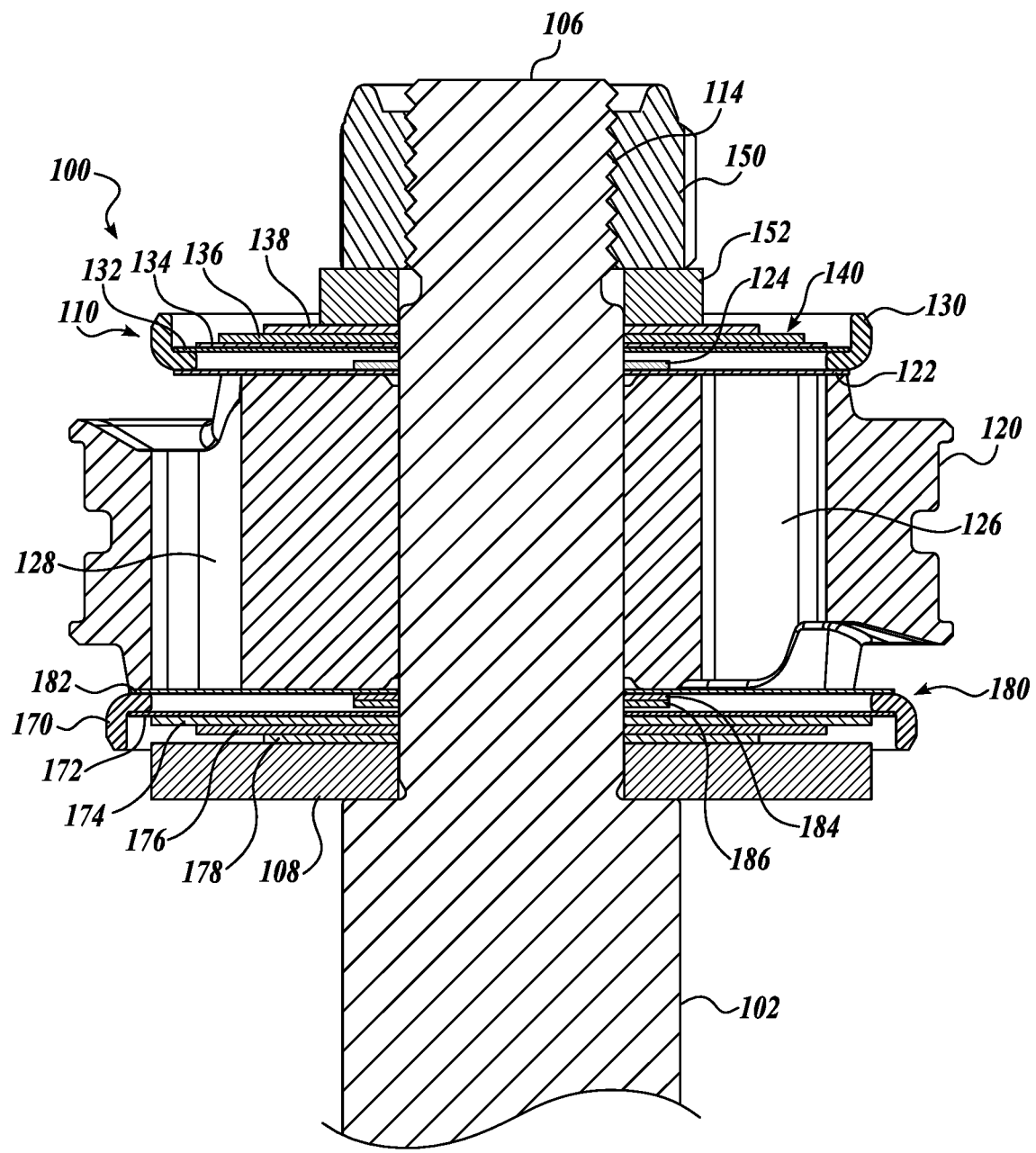
FIG. 4 is a cutaway side view of the damper valve assembly of FIG. 1, showing the cut along arrows A-B as indicated in FIG. 3.

Now referring to the compression shim assembly 180, as shown most clearly in FIGS. 2 and 3, a compression overlap shim 182 is configured to closely interface the piston 120 and overlap the compression valves 128 as described above. The compression overlap shim 182 provides the initial sealing component to prevent flow of the hydraulic damping fluid through the compression valves 128 during the rebound stroke of the shaft 102. The interface of the compression overlap shim 182 with the compression valves 128 of the piston 120 is shown in FIG. 4. As illustrated, the compression overlap shim 182 overlaps the compression valve 128 to prevent the flow of hydraulic damping fluid while the piston travels in the direction of the rebound stroke (i.e., travel in a direction leading with the distal end 104 of the shaft 102).

Adjacent to the compression overlap shim 182 is assembled a first compression preload adjustment washer 184 and a second compression preload adjustment washer 186, which will be described in greater detail below. At an outer perimeter of the compression overlap shim 182, a compression preload ring shim 170 is adjacent to the compression overlap shim 182. Next, a compression shim stack assembly 190 is disposed adjacent a radially inward annular projection (not shown, but substantially similar to 166 in FIG. 10) of the compression preload ring shim 170. The compression shim stack assembly 190 interfaces the radially inward annular projection in an axial direction, and the necked section 112 of the shaft 102 in a radial direction at the inner aperture of each shim in the compression shim stack assembly 190. The compression shim stack assembly 190 is illustrated as having a first compression shim 172, a second compression shim 174, a third compression shim 176, and a fourth compression shim 178, each shim in order of descending outer radius away from the compression preload ring shim 170. The first compression shim 172 is radially sized to interface a circumferential projection (not shown, but substantially similar to 168 in FIG. 10) of the compression preload ring shim 170.

As can be seen most clearly in FIG. 4, the stacked configuration of the compression shim assembly 180 contains a gap between the first compression shim 172 and the second compression preload adjustment washer 186. To set a preload in the compression shim assembly 180 the aforementioned gap is drawn together by tightening the nut 150 during assembly, such that the first compression shim 172 and the second compression preload adjustment washer 186 abut (see FIG. 5). As shown in the transition from FIG. 4 to FIG. 5, the compression shim stack assembly 190 is deflected as a result of drawing the first compression shim 172 to the second compression preload adjustment washer 186 during tightening of the nut 150. In this configuration, the amount of preload on the compression shim stack assembly 190 can be controlled by the width of the gap.

One embodiment of the compression preload adjustment will now be described in detail below. The compression preload ring shim 170 is substantially similar to the rebound preload ring shim 130 shown in FIG. 10, including the radially inward annular projection having a ring shim axial thickness, and the circumferential projection having a ring shim height. The compression preload ring shim 130 also has a diameter sized such that the first compression shim 172 fits within the aperture of the circumferential projection and abuts an upper surface of the radially inward annular projection. As can be appreciated by the configuration shown in FIG. 4, the gap between the first compression shim 172 and the second compression preload adjustment washer 186 is controlled by the ring shim axial thickness and the thickness of the first and second compression preload adjustment washers 184 and 186. In one example, if a preload gap distance of 0.010" is desired, the ring shim axial thickness can be 0.040" and the first compression preload adjustment washer 184 can be 0.020" in thickness, with the second compression preload adjustment washer 186 at a thickness of 0.010" to arrive at the desired 0.010" preload gap distance. In other embodiments, any combination of ring shim axial thickness and thickness of the first and second compression preload adjustment washers 184 and 186 is used to suitably control the preload gap distance. In further embodiments, the first and second compression preload adjustment washers 184 and 186 are omitted, a single compression preload adjustment washer is used, or more than two compression preload adjustment washers are used with the configuration. In embodiments where the first and second compression preload adjustment washers 184 and 186 are omitted, the first compression shim 172 directly abuts the compression overlap shim 182 upon drawing the components together with the nut 150.

Like the rebound shim assembly 110, one advantage of assembling the compression shim assembly 180 with the first and second compression preload adjustment washers 184 and 186, and the compression preload ring shim 170, is to limit the need for compression preload ring shims 170 with a wide variety of ring shim axial thicknesses. In this regard, fewer part variations can be manufactured and adapted to fit a wider range of preload settings. In another aspect, as a result of the radial interface of the first compression shim 172 with the circumferential projection of the compression preload ring shim 170, the compression preload ring shim 170 is substantially axially centered with respect to the shaft 102. The circumferential projection of the compression preload ring shim 170 additionally provides structural rigidity to the compression preload ring shim 130 for further consistency in preload settings and damping characteristics of the assembly.

Figure 6:
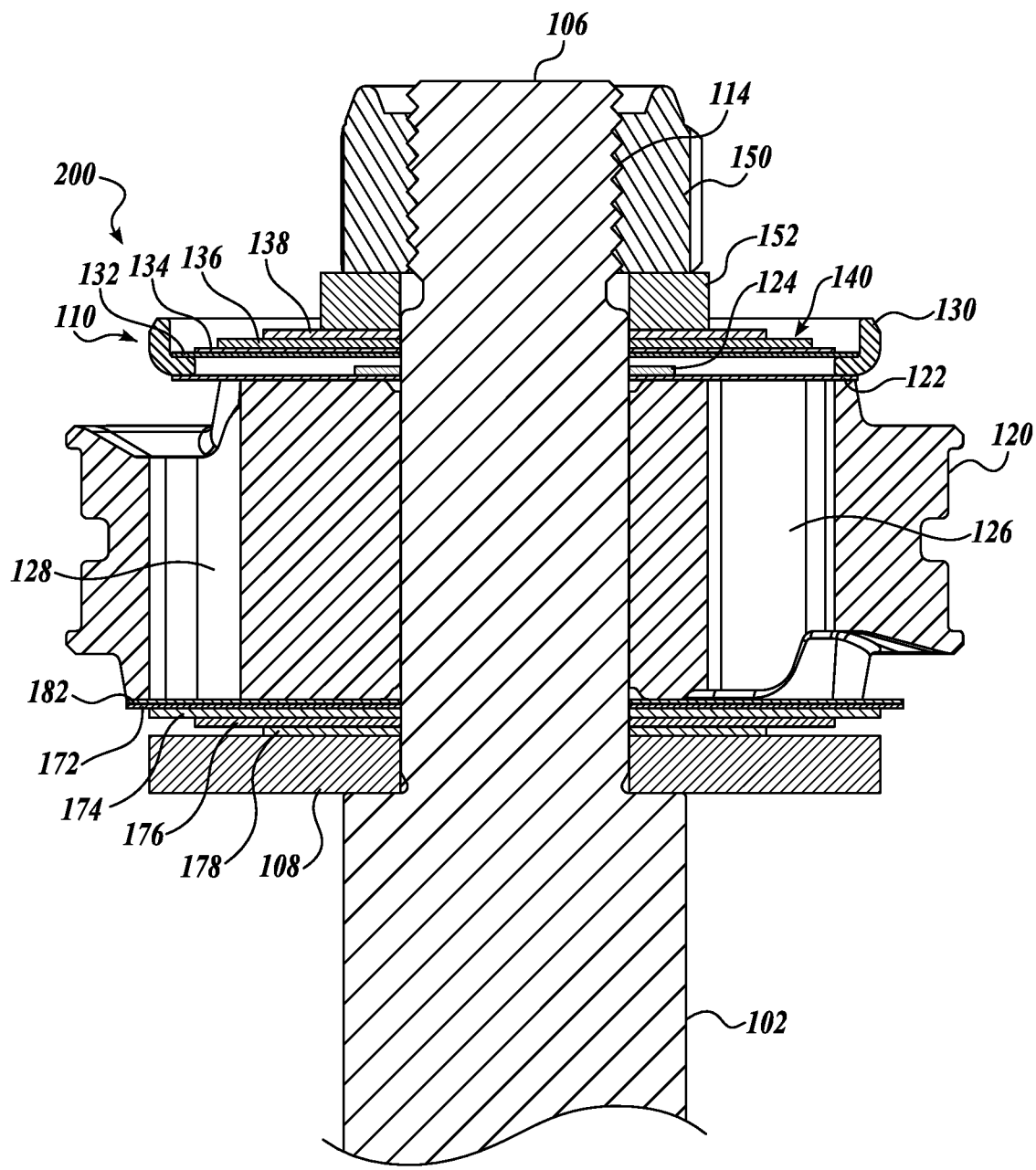
FIG. 6 is a cutaway side view of another representative embodiment of a damper valve assembly in accordance with an aspect of the present disclosure, showing the cut along arrows A-B as indicated in FIG. 3.
Figure 7:
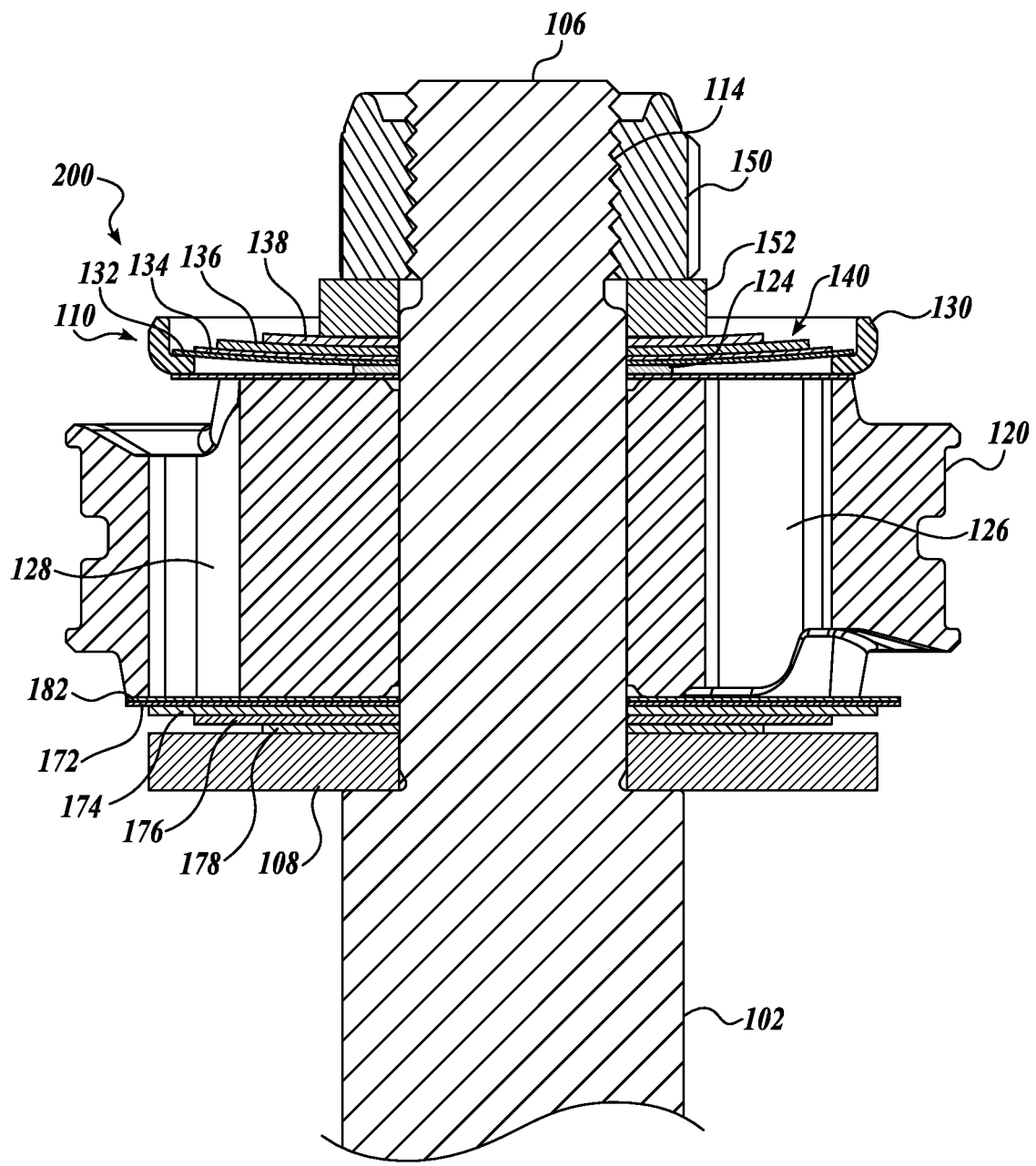
FIG. 7 is a cutaway side view of the damper valve assembly of FIG. 6, showing the cut along arrows A-B as indicated in FIG. 3, with a rebound shim stack in a preloaded configuration.
Figure 8:
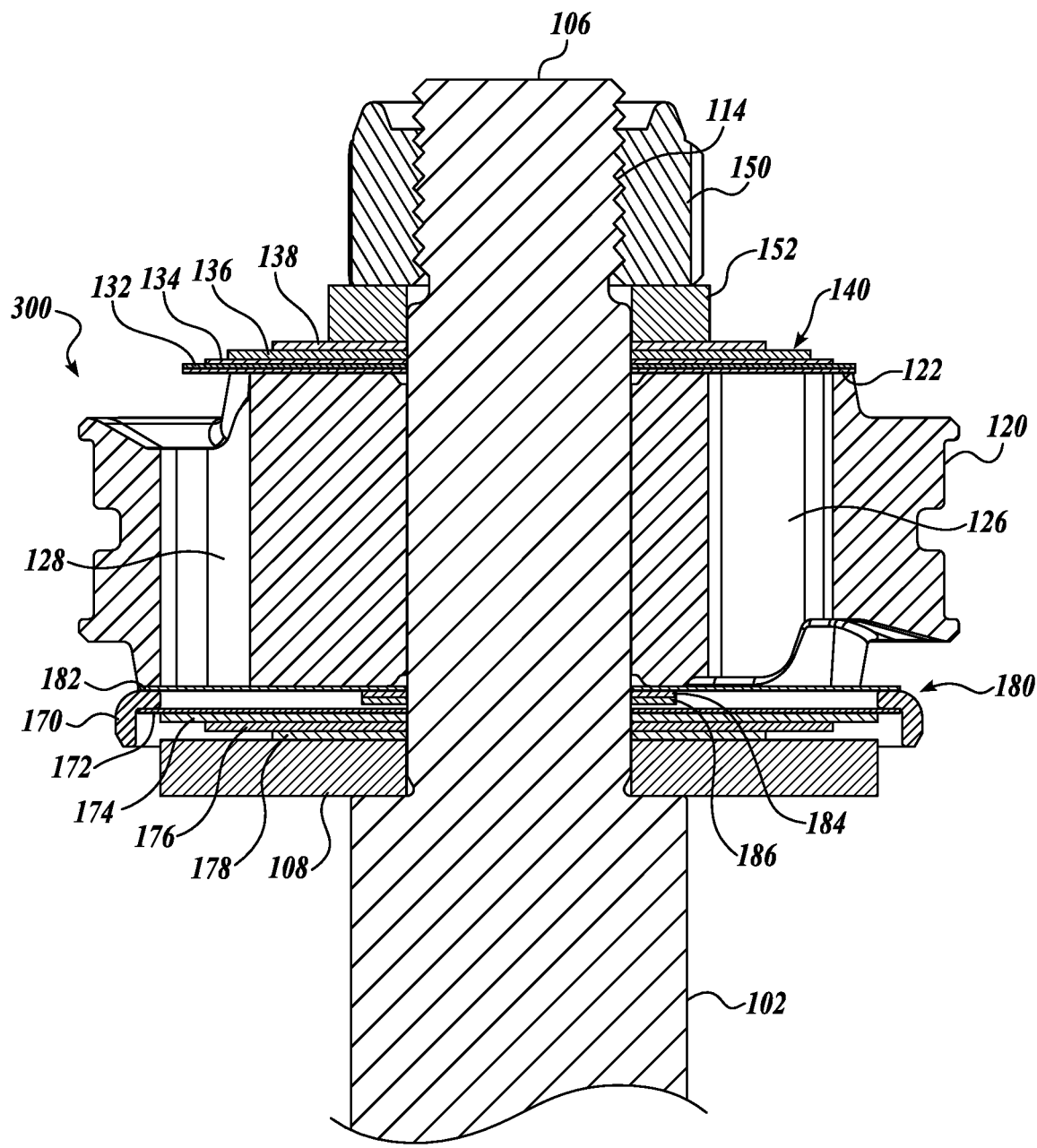
FIG. 8 is a cutaway side view of another representative embodiment of a damper valve assembly in accordance with an aspect of the present disclosure, showing the cut along arrows A-B as indicated in FIG. 3.
Figure 9:
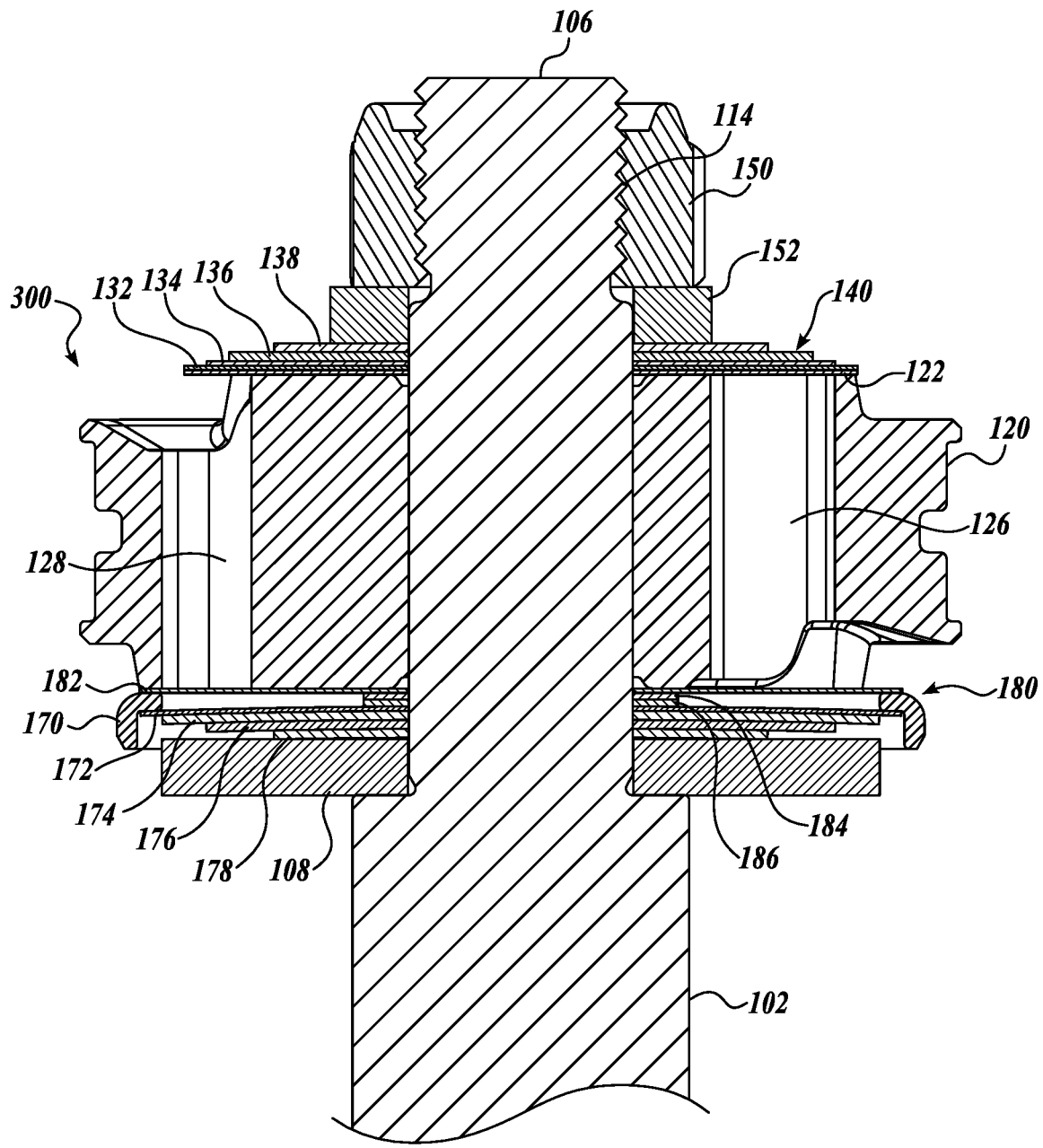
FIG. 9 is a cutaway side view of the damper valve assembly of FIG. 8, showing the cut along arrows A-B as indicated in FIG. 3, with a compression shim stack in a preloaded configuration.

As shown in the embodiments of the shimmed piston assembly 100 in FIGS. 1-5, a preload ring shim is used in both the rebound shim assembly 110 and the compression shim assembly 180; however, in other embodiments, a preload ring shim is suitably used on only the rebound shim assembly 110 (see FIGS. 6 and 7), or, conversely, a preload ring shim is suitably used on only the compression shim assembly 180 (see FIGS. 8 and 9). In the embodiments shown in FIGS. 6 and 7 where the compression preload ring shim 180 is omitted, the shim assembly is shown without a preload (FIG. 7) and the first and second compression preload adjustment washers 184 and 186 are likewise omitted. Similarly, in the embodiments shown in FIGS. 8 and 9 where the rebound preload ring shim 130 is omitted, the shim assembly is shown without a preload (FIG. 9) and the rebound preload adjustment washer 124 is likewise omitted.

Figure 11:
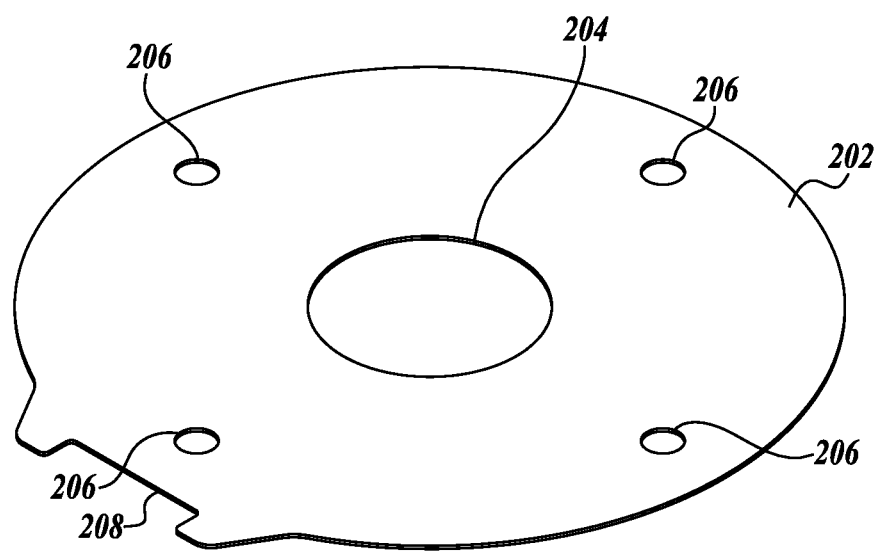
FIG. 11 is a perspective view of one representative embodiment of a sealing shim having bleed ports in accordance with an aspect of the present disclosure.
Figure 12:
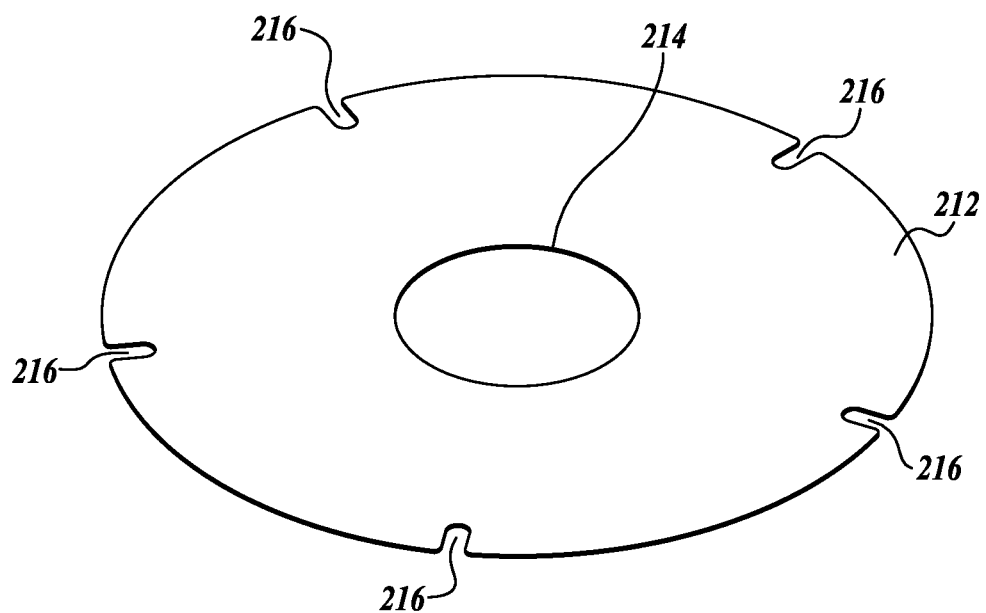
FIG. 12 is a perspective view of one representative embodiment of a preload shim having bleed ports in accordance with an aspect of the present disclosure.

The following description references compression of the damper; however, in other embodiments the components and configuration below apply to rebound of the damper, and are also within the scope of the present disclosure. Turning now to FIGS. 11 and 12, embodiments of a sealing shim 202 (FIG. 11) and a preload shim 212 (FIG. 12) are shown. The sealing shim 202 includes a shaft aperture 204 and one or more bleed ports 206 sized and configured to allow metered flow of hydraulic damping fluid during a compression stroke. In some embodiments, the bleed ports 206 are each aligned with a compression valve 128, such that each compression valve 128 interfaces one bleed port 206. In other embodiments, the bleed ports 206 are aligned with only certain compression valves 128, such that fewer than all of the compression valves 128 include a bleed port 206, or multiple bleed ports 206 are aligned with each compression valve 128. In further embodiments, any number of bleed ports 206 is included in the sealing shim 202 and aligned with each compression valve 128. It is intended that any combination of alignment of the bleed ports 206 with the compression valves 128, or the absence thereof, is within the scope of the present disclosure. As a result of the alignment of the bleed ports 206, the sealing shim 202 may further include a clocking feature 208 to provide an aid in assembly of the compression shim assembly 220 to ensure the desired alignment of the bleed ports 206. In the embodiments, the bleed ports 206 are any position, shape, size, and plurality suitable for the flow of hydraulic damping fluid during the compression stroke, based on the desired damping characteristics.

As shown in FIG. 12, the preload shim 212 includes a shaft aperture 214 and one or more bleed reliefs 216 sized and configured to allow metered flow of the hydraulic damping fluid during a compression stroke. In some embodiments, the bleed reliefs 216 are positioned near the outer circumference of the preload shim 212 such that the bleed reliefs 216 provide a passageway for the hydraulic damping fluid to flow past a compression preload ring shim 222 positioned in the compression shim assembly 220 (see FIG. 13) as will be shown in greater detail below. In the embodiments, the bleed reliefs 216 are any position, shape, size, and plurality suitable for the flow of hydraulic damping fluid during the compression stroke, based on the desired damping characteristics.

An embodiment of a configuration of the compression shim assembly 220 will now be described in greater detail with reference to FIGS. 13-16. The following description provides examples related to the illustrated embodiments; however, in other embodiments any suitable configuration of the shim assembly 220 is within the scope of the present disclosure. As shown, the compression shim assembly 220 is positioned along the shaft 102 between the primary washer 108 and the piston 120. The compression shim assembly 220 includes a plurality of sealing shims 202 positioned between the piston 120 and the compression preload ring shim 222. As described above, the sealing shims 202 include one or more bleed ports 206 aligned with the compression valves 128 of the piston 120. In the illustrated embodiment, three sealing shims 202 are provided. However, in other embodiments, any number of sealing shims 202 is included in the compression shim assembly.

Figure 5:
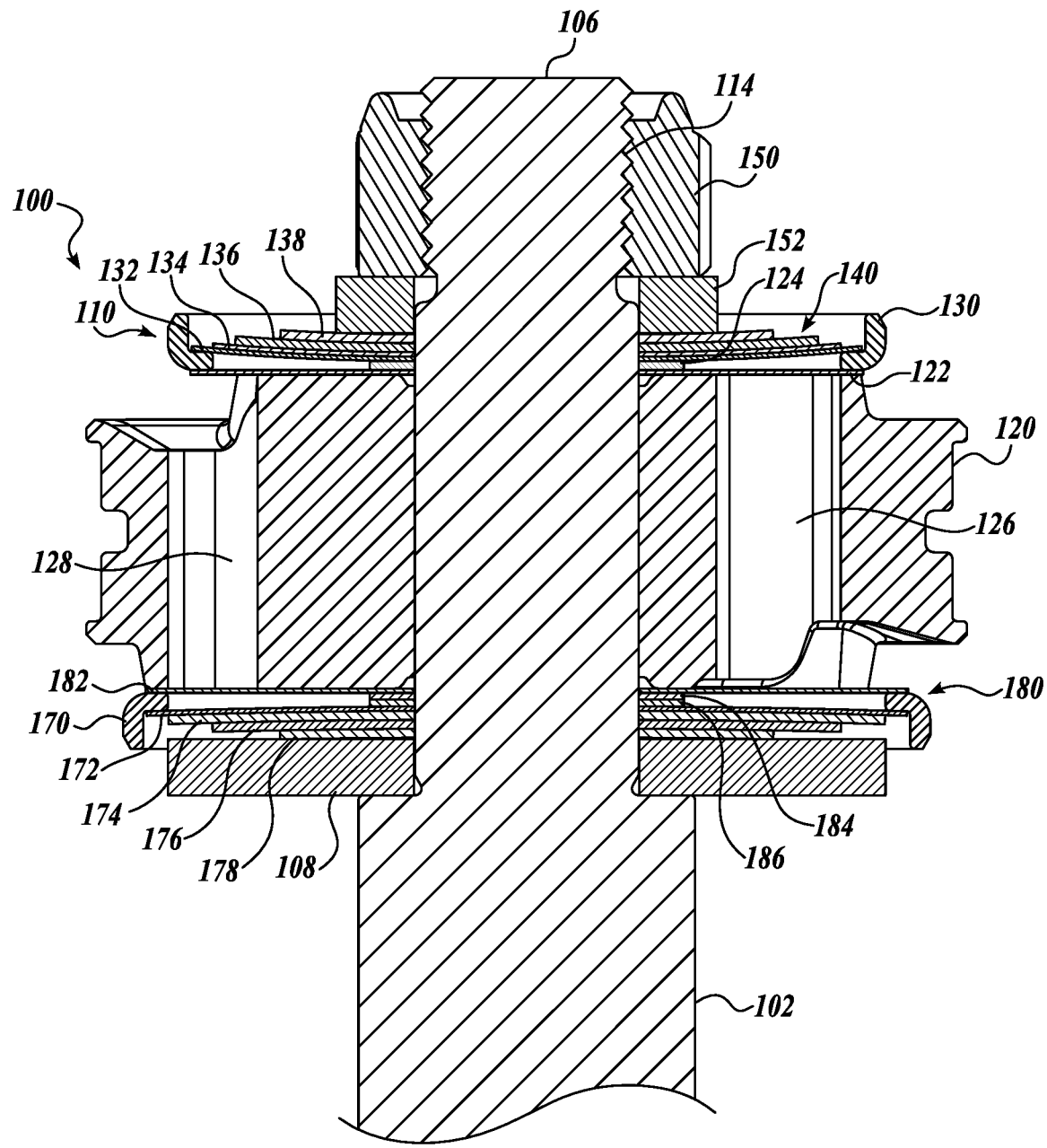
FIG. 5 is a cutaway side view of the damper valve assembly of FIG. 1, showing the cut along arrows A-B as indicated in FIG. 3, with a compression shim stack and a rebound shim stack in preloaded configurations.

The compression preload ring shim 222 is substantially similar to the compression preload ring shim 170 shown in FIGS. 5 and 10, including the radially inward annular projection having a ring shim axial thickness, and the circumferential projection having a ring shim height. The compression preload ring shim 222 has a diameter sized such that the preload shim 212 fits within the aperture of the circumferential projection and abuts an upper surface of the radially inward annular projection.

In the illustrated embodiments, the compression shim assembly 220 includes a primary shim stack 230 positioned between the compression preload ring shim 222 and the primary washer 108. In the illustrated embodiment, the primary shim stack 230 includes one preload shim 212, positioned adjacent the compression preload ring shim 222, and one or more deflecting shims 232. In other embodiments, the primary shim stack 230 includes more than one preload shim 212. In some embodiments, deflecting shims 232 are similar in configuration to the first compression shim 172 (see FIG. 5).

Figure 13:
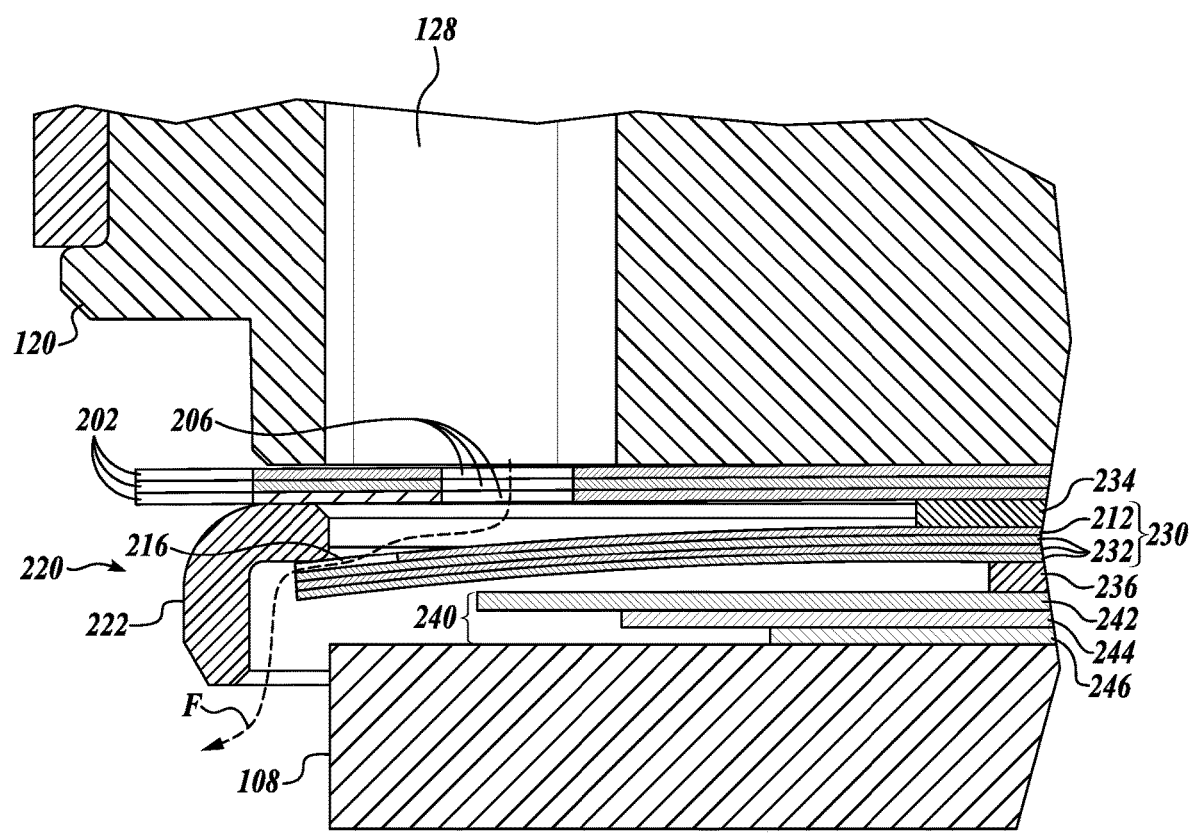
FIG. 13 is a partial cutaway side view of another representative embodiment of a damper valve assembly in accordance with an aspect of the present disclosure, taken at a first circumferential position along arrow A as indicated in FIG. 3, showing a shim stack in a first stage compression configuration.

As can be appreciated by the configuration shown in FIG. 13, the gap between the preload shim 212 and the plurality of sealing shims 202 is controlled by the axial thickness of the compression preload ring shim 222 and the thickness of a compression preload adjustment washer 234. The difference between the axial thickness of the compression preload ring shim 222 and the compression preload adjustment washer 234 provides a deflection of the primary shim stack 230. In one example, if a preload gap distance of 0.010" is desired, the ring shim axial thickness can be 0.040" and the compression preload adjustment washer 234 can be 0.030" in thickness to arrive at the desired 0.010" preload gap distance. In other embodiments, any combination of ring shim axial thickness and thickness of the compression preload adjustment washer 234 is used to suitably control the preload gap distance. In further embodiments, more than two compression preload adjustment washers are used with the configuration.

Similarly to the rebound shim assembly 110 and the compression shim assembly 180, one advantage of assembling the compression shim assembly 220 with the compression preload adjustment washer 234, and the compression preload ring shim 222, is to limit the need for compression preload ring shims 222 with a wide variety of ring shim axial thicknesses. In this regard, fewer part variations can be manufactured and adapted to fit a wider range of preload settings.

In the illustrated embodiments, the compression shim assembly 220 includes a secondary shim stack 240 positioned between the primary shim stack 230 and the primary washer 108. In the illustrated embodiment, the secondary shim stack 240 includes one or more deflecting compression shims, a first compression shim 242, a second compression shim 244, a third compression shim 246. In other embodiments, the secondary shim stack 240 includes any number, size, or configuration of deflecting compression shims. In some embodiments, the compression shim 242, 244, and 246 are similar in configuration to the compression shims 172, 174, and 176 (see FIG. 5). In some embodiments, the gap between the secondary shim stack 240 and the primary shim stack 230 is controlled by the axial thickness of a compression secondary washer 236.

In view of FIGS. 13-16, the flow paths of the hydraulic damping fluid during different stages of compression will now be described in detail. The configuration of the compression shim assembly provides four flow paths depending on the shaft speed during compression of the damper. As described herein, the four flow paths correspond to four stages of compression of the damper. The shaft speeds described for each stage are exemplary and for illustration purposes only. Depending on various characteristics, such as the bleed rate, shim deflection stiffness, number of shims, position of shims, etc., the shaft speed for each stage may vary. In this regard, any shaft speed range for each stage is within the scope of the present disclosure. As above, although the following description references compression of the damper, the embodiments and configurations are also applicable to rebound of the damper, and such configurations are also within the scope of the present disclosure.

In one embodiment, a first stage has a shaft speed between about 0 inches and 2 inches per second, a second stage has a shaft speed between about 1 inches and 5 inches per second, a third stage has a shaft speed between about 3 inches and 20 inches per second, and a fourth stage has a shaft speed between about 20 inches and 40 inches per second. In these embodiments, the shaft speed ranges for each stage may vary depending on the configuration of the components of the damper, and may overlap such that more than one stage is active simultaneously. In this regard, any number of stages may be active during use of the damper. In general, the first stage is the slowest shaft speed of the damper, such as during flowing travel over gravel. The second stage is the next slowest shaft speed of the damper, such as when traveling over expansion joints. The third stage is the next slowest shaft speed of the damper, such as when traveling over minor potholes. The fourth stage is the fastest shaft speed of the damper, such as when impacting larger obstacles at higher speeds. Using embodiments of the present disclosure, damping characteristics for each stage can be separately tuned to provide improved ride quality and performance, among other advantages.

The flow path of the hydraulic damping fluid during shaft speeds of the first stage is shown in FIG. 13. During compression events having a shaft speed in the range of the first stage, the pressure of the hydraulic damping fluid does not rise to a level to cause any further deflection of the components of the compression shim assembly 220. During this first stage, the hydraulic damping fluid will flow along flow path F from the compression valves 128, through one or more bleed ports 206 of the sealing shims 202, and into a gap between the sealing shims 202 and the primary shim stack 230. The gap is created by the axial thickness of the compression preload ring shim 222 and the thickness of a compression preload adjustment washer 234. Next, the hydraulic damping fluid flows from the gap through the bleed reliefs 216 of the preload shim 212. As shown, the bleed reliefs 212 of the preload shim 212 provide a passageway for the hydraulic damping fluid to exit the gap between the sealing shims 202 and the primary shim stack 230.

Figure 14:
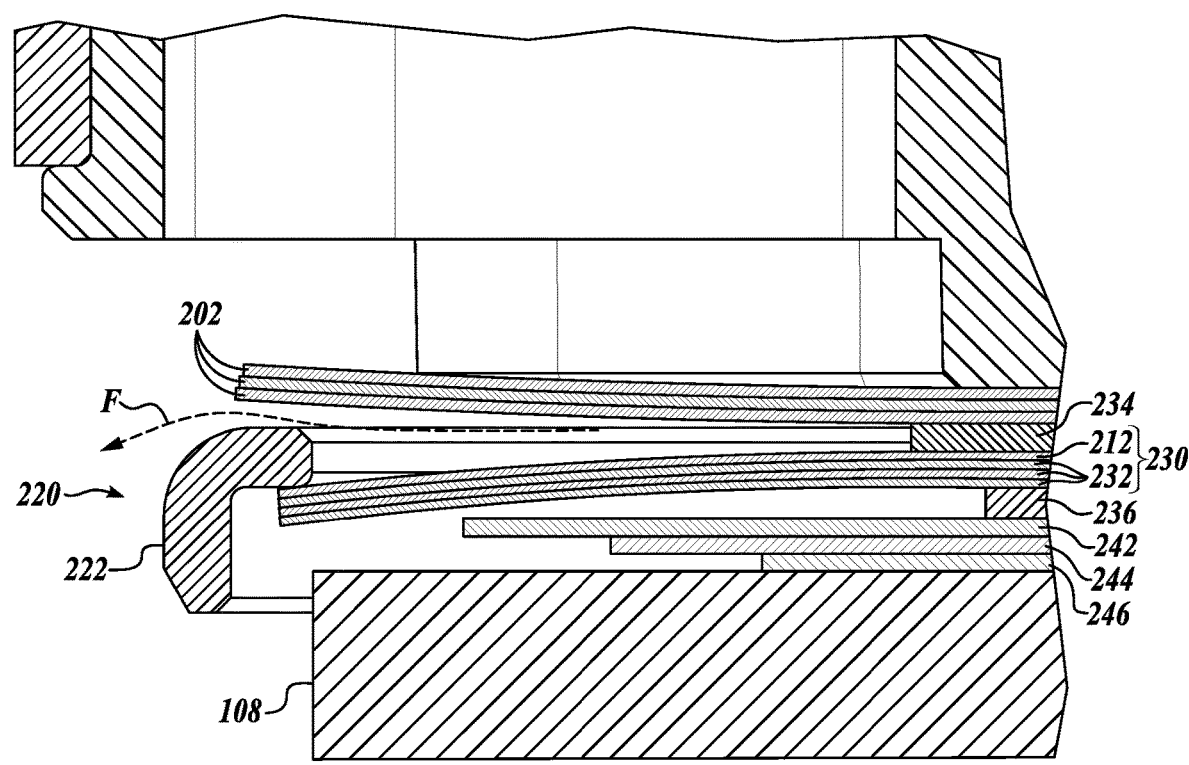
FIG. 14 is a partial cutaway side view of the valve assembly of FIG. 13 taken at a second circumferential position along arrow C as indicated in FIG. 3, showing the shim stack in a second stage compression configuration.

The flow path of the hydraulic damping fluid during shaft speeds of the second stage is shown in FIG. 14. During compression events having a shaft speed in the range of the second stage, the pressure of the hydraulic damping fluid rises to a level that causes deflection of the sealing shims 202 away from compression preload ring shim 222. During the second stage, the hydraulic damping fluid will still flow along the flow path of the first stage, but will primarily flow along the path F from the compression valves 128, through one or more bleed ports 206 of the sealing shims 202, into a gap between the sealing shims 202 and the primary shim stack 230, and through an opening between the sealing shims 202 and the compression preload ring shim 222 caused by deflection of the sealing shims 202. As shown, portions of the piston 120 aligned with the rebound valves 126 do not contact the upper sealing shim 202, such that the sealing shims 202 can regionally deflect upward ("backbend") in areas aligned with the rebound valves 126.

Figure 15:
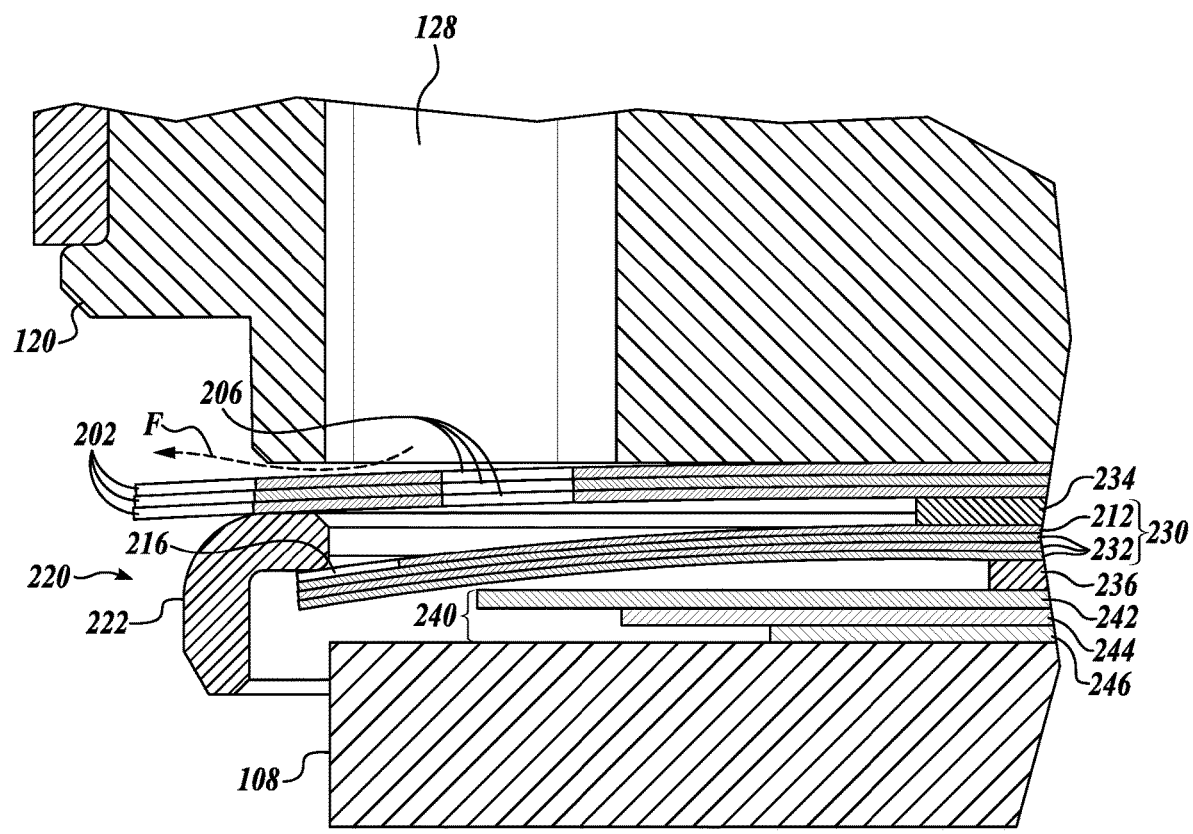
FIG. 15 is a partial cutaway side view of the valve assembly of FIG. 13, taken at the first circumferential position along arrow A as indicated in FIG. 3, showing the shim stack in a third stage compression configuration.

The flow path F of the hydraulic damping fluid during shaft speeds of the third stage is shown in FIG. 15. During compression events having a shaft speed in the range of the third stage, the pressure of the hydraulic damping fluid rises to a level that causes deflection of the sealing shims 202, movement of the compression preload ring shim 222, and deflection of the primary shim stack 230. During the third stage, the hydraulic damping fluid will still flow along the flow path of the first stage, but will primarily flow along the path F from the compression valves 128 to the exterior of the piston 120. At the hydraulic damping fluid pressures of the third stage, the hydraulic damping fluid overcomes the stiffness of the sealing shims 202 and the primary shim stack 230 to deflect the sealing shims 202 away from the compression valves 128. During the deflection, the primary shim stack 230 additionally deflects away from the compression valves 128 by movement of the compression preload ring shim 222 away from the compression valves 128.

Figure 16:
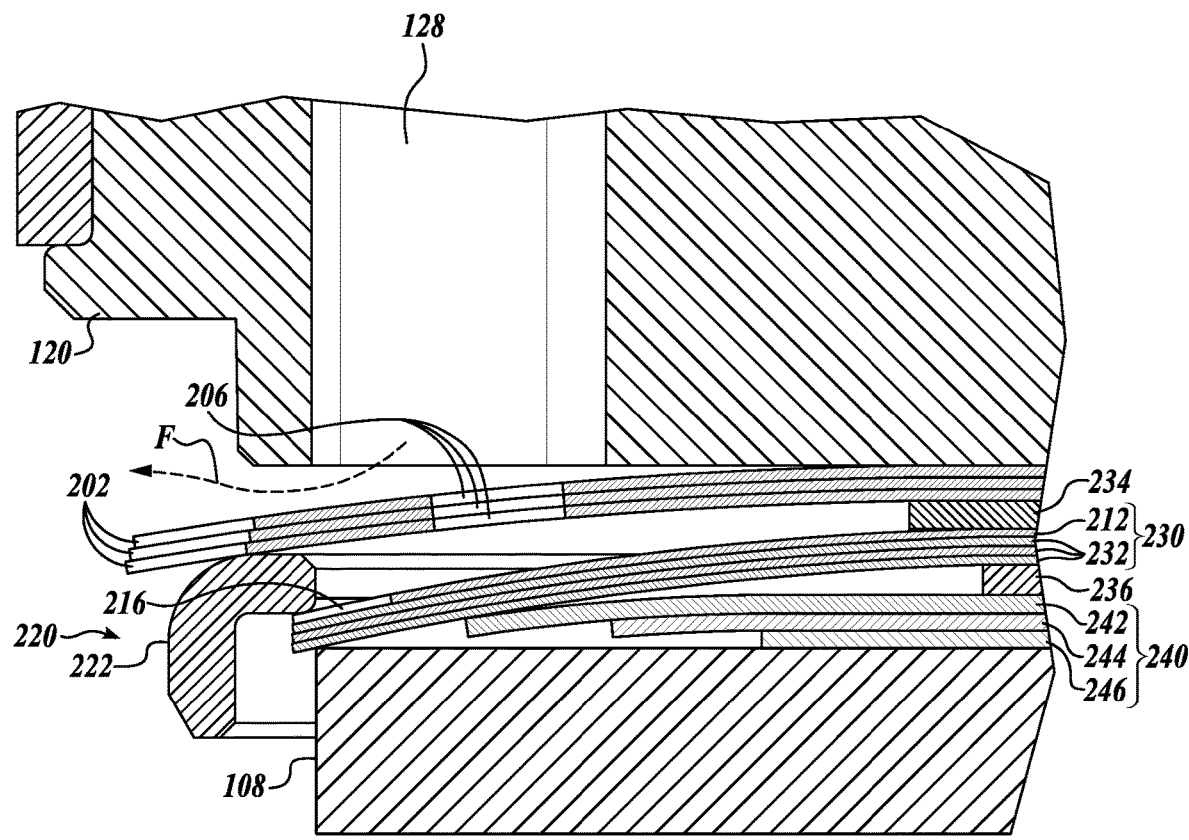
FIG. 16 is a partial cutaway side view of the valve assembly of FIG. 13, taken at the first circumferential position along arrow A as indicated in FIG. 3, showing the shim stack in a fourth stage compression configuration.

The flow path F of the hydraulic damping fluid during shaft speeds of the fourth stage is shown in FIG. 16. During compression events having a shaft speed in the range of the fourth stage, the pressure of the hydraulic damping fluid rises to a level that causes deflection similar to the third stage, but of a greater magnitude such that the primary shim stack 230 contacts the secondary shim stack 240 and causes larger deflection of the secondary shim stack 240. In this regard, the fourth stage flow path F is the same as the third stage, but the opening is larger to provide a higher flow rate of the hydraulic damping fluid. Likewise, a minor portion of the flow will follow the flow path of the first stage. By utilizing the secondary shim stack 240, the compression of the damper during the fourth stage can be tuned to limit travel such that the wheel and tire of the vehicle do not contact other components of the vehicle, or cause damage to any of the related components.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A damper having a shimmed piston, comprising:
an elongate shaft having a first end and a fastener configured to retain the piston on the first end, the piston having a proximal end, a distal end, and a first valve extending therethrough; and
a first shim assembly disposed around the elongate shaft at the first end and adjacent to the distal end of the piston, the first shim assembly comprising:
a first shim having a first bleed port in fluid communication with the first valve and a central aperture configured to receive the elongate shaft, the first shim configured to overlap the first valve at the distal end of the piston;
a first ring shim assembled to the first end of the elongate shaft and configured to abut the first shim;
a second shim installed at the first end of the elongate shaft, the second shim interfacing a radially inward projection of the first ring shim and having a first bleed relief such that when the second shim abuts the radially inward projection of the first ring shim, the first bleed relief provides a fluid path across the second shim along a surface of the first ring shim; and
a third shim positioned at a distance from the second shim, wherein the third shim is configured to deflect away from the piston as a result of a contact force by the second shim during deflection of the second shim as a result of damping fluid flow through the first valve.

2. The damper of claim 1, wherein the first shim further comprises a clocking protrusion positioned relative to the first bleed port, the clocking protrusion configured to position the first bleed port relative to the first valve.

3. The damper of claim 1, wherein the second shim is deflectable to provide a preload to the first shim assembly in reaction to clamping the piston with the fastener.

4. The damper of claim 3, wherein a perimeter of the central aperture of the first shim is fixed in a direction along the elongate shaft by the clamping of the piston with the fastener.

5. The damper of claim 1, wherein the third shim is positioned at a distance from the second shim by a washer positioned therebetween, and wherein the diameter of the washer is smaller than the diameter of the third shim.

6. The damper of claim 1, wherein the piston further comprises a second valve, and wherein the first shim is configured to deflect away from the first ring shim at portions of the first shim adjacent to the second valve.

7. The damper of claim 1, wherein the first shim is configured to deflect away from the piston as a result of damping fluid flow through the first valve.

8. The damper of claim 1, wherein the first ring shim has a wall projecting axially from a surface of the radially inward projection configured to stiffen the first ring shim upon installation.

9. The damper of claim 1, further comprising:
a second valve extending through the piston; and
a second shim assembly disposed around the elongate shaft at the first end and adjacent to the proximal end of the piston, the second shim assembly comprising:
a fourth shim having a second bleed port in fluid communication with the second valve and a central aperture configured to receive the elongate shaft, the fourth shim configured to overlap the second valve at the proximal end of the piston; and
a second ring shim assembled to the first end of the elongate shaft such that the fourth shim is positioned between the piston and the second ring shim,
wherein the second bleed port provides a fluid path across the fourth shim along a surface of the piston.

10. A shimmed piston for a damper, comprising:
a first valve extending through the shimmed piston; and
a first shim assembly disposed adjacent to a distal end of the shimmed piston, the first shim assembly comprising:
a first shim comprising a first bleed port in fluid communication with the first valve and a central aperture configured to receive an elongate shaft, the first shim configured to overlap the first valve at the distal end of the shimmed piston, wherein the first shim further comprises a clocking protrusion positioned relative to the first bleed port, the clocking protrusion configured to position the first bleed port relative to the first valve;
a first ring shim configured to abut the first shim; and
a second shim interfacing a radially inward projection of the first ring shim and having a first bleed relief such that when the second shim abuts the radially inward projection of the first ring shim, the first bleed relief provides a fluid path across the second shim along a surface of the first ring shim.

11. The shimmed piston of claim 10, wherein the second shim is deflectable to provide a preload to the first shim assembly in reaction to clamping the shimmed piston with a fastener.

12. The shimmed piston of claim 11, wherein a perimeter of the central aperture of the first shim is configured to be fixed in a direction along the elongate shaft by the clamping of the shimmed piston with the fastener.

13. The shimmed piston of claim 10, wherein the first shim assembly further comprises a third shim positioned at a distance from the second shim, wherein the third shim is configured to deflect away from the shimmed piston as a result of a contact force by the second shim during deflection of the second shim as a result of damping fluid flow through the first valve.

14. The shimmed piston of claim 13, wherein the third shim is positioned at a distance from the second shim by a washer positioned therebetween, and wherein the diameter of the washer is smaller than the diameter of the third shim.

15. The shimmed piston of claim 10, further comprising a second valve, wherein the first shim is configured to deflect away from the first ring shim at portions of the first shim adjacent to the second valve.

16. The shimmed piston of claim 10, wherein the first shim is configured to deflect away from the shimmed piston as a result of damping fluid flow through the first valve.

17. The shimmed piston of claim 10, wherein the first ring shim has a wall projecting axially from a surface of the radially inward projection configured to stiffen the first ring shim upon installation.

18. The shimmed piston of claim 10, further comprising:
- a second valve extending through the shimmed piston; and
- a second shim assembly disposed adjacent to a proximal end of the shimmed piston, the second shim assembly comprising:
  - a fourth shim having a second bleed port in fluid communication with the second valve and a central aperture configured to receive the elongate shaft, the fourth shim configured to overlap the second valve at the proximal end of the shimmed piston; and
  - a second ring shim positioned such that the fourth shim is positioned between the piston and the second ring shim,
- wherein the second bleed port provides a fluid path across the fourth shim along a surface of the shimmed piston.

* * * * *